(12) United States Patent
Ceze et al.

(10) Patent No.: US 9,819,687 B2
(45) Date of Patent: Nov. 14, 2017

(54) REDUCING WEB BROWSING OVERHEADS WITH EXTERNAL CODE CERTIFICATION

(75) Inventors: Luis Ceze, Seattle, WA (US);
Gheorghe C. Cascaval, Palo Alto, CA (US); Mohammad H. Reshadi, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 13/399,126

(22) Filed: Feb. 17, 2012

(65) Prior Publication Data

US 2013/0198612 A1    Aug. 1, 2013

Related U.S. Application Data

(60) Provisional application No. 61/591,141, filed on Jan. 26, 2012.

(51) Int. Cl.
*G06F 17/00* (2006.01)
*H04L 29/06* (2006.01)
(Continued)

(52) U.S. Cl.
CPC ...... *H04L 63/123* (2013.01); *G06F 17/30899* (2013.01); *G06F 21/64* (2013.01); *G06F 21/51* (2013.01)

(58) Field of Classification Search
CPC ....... G06F 2221/2119; G06F 17/30899; G06F 21/44
(Continued)

(56) References Cited

U.S. PATENT DOCUMENTS 6,910,128 B1   6/2005   Skibbie et al.
7,398,433 B2   7/2008   Benedek et al.
(Continued)

FOREIGN PATENT DOCUMENTS

CN   101102187 A   1/2008
EP     1091276 A1   4/2001
(Continued)

OTHER PUBLICATIONS

Ravi Chugh etal., "Staged Information Flow for JavaScript," PDLI'09, Dublin, Jun. 15-20, 2009.
(Continued)

*Primary Examiner* — Andrew McIntosh
(74) *Attorney, Agent, or Firm* — The Marbury Law Group, PLLC

(57) ABSTRACT

Methods, servers, and systems for using signatures/certifications embedded in pre-processed code to enable use or reuse of pre-processed code to obviate the need to perform some operations or execute some scripts within the web page content. One or more operations may be performed within an executable script in web page content and signing the result of the operation in a manner that can be used to verify that the corresponding operation may be skipped by a browser. A browser receiving signed pre-processed code may use a signature verification process to determine whether the browser can bypass executing corresponding scripts in the web page content or perform alternative operations. Operations may be pre-performed and the results signed by off-line tools and included in the web page content. Results of operations may be stored in memory along with a signature so the results of the operation can be reused in the future.

108 Claims, 7 Drawing Sheets

(51) Int. Cl.
*G06F 17/30* (2006.01)
*G06F 21/64* (2013.01)
*G06F 21/51* (2013.01)

(58) Field of Classification Search
USPC .......................................................... 715/273
See application file for complete search history.

(56) References Cited

U.S. PATENT DOCUMENTS

| | | |
|---|---|---|
| 7,747,866 B1 | 6/2010 | Everhart |
| 7,971,194 B1 | 6/2011 | Gilboa |
| 8,549,472 B1 * | 10/2013 | Tilwani .......................... 717/109 |
| 8,812,853 B1 * | 8/2014 | Atkins ............... H04N 21/4788 713/176 |
| 2002/0040431 A1 * | 4/2002 | Kato et al. ..................... 713/168 |
| 2005/0066339 A1 | 3/2005 | Thoen |
| 2009/0113341 A1 | 4/2009 | Kanemitsu |
| 2010/0037062 A1 * | 2/2010 | Carney ................. H04L 9/3247 713/176 |
| 2010/0037317 A1 | 2/2010 | Oh |
| 2010/0185869 A1 | 7/2010 | Moore et al. |
| 2010/0275026 A1 * | 10/2010 | McLean ........................ 713/176 |
| 2011/0239288 A1 | 9/2011 | Cross et al. |
| 2012/0278700 A1 * | 11/2012 | Sullivan et al. .............. 715/235 |

FOREIGN PATENT DOCUMENTS

| | | |
|---|---|---|
| JP | 2005267593 A | 9/2005 |
| JP | 2008098795 A | 4/2008 |
| JP | 2009110358 A | 5/2009 |
| WO | 02089001 A2 | 11/2002 |

OTHER PUBLICATIONS

Robert Wahbe et al., "Efficient Software-Based Fault Isolation," Proceedings of the Symposium on Operating System Principles, 1993.

Bennet Yee et al., "Native Client: A Sandbox for Portable, Untrusted x86 Native Code," IEEE Symposium on Security and Privacy. 2009.

International Search Report and Written Opinion—PCT/US2013/020613—ISA/EPO—dated Apr. 24, 2013.

Tamura T., et. al, "Effects of Program Transformation Based on Lambda Lifting in JavaScript", Information Processing Society of Japan, Symposium, Programming Symposium, Summer 2011, May 26, 2014, pp. 19-26.

* cited by examiner

REDUCING WEB BROWSING OVERHEADS WITH EXTERNAL CODE CERTIFICATION

RELATED APPLICATIONS

This application claims the benefit of priority to U.S. Provisional Application No. 61/591,141, entitled "Reducing Web Browsing Overheads with External Code Certification" filed Jan. 26, 2012, which is hereby incorporated by reference in its entirety.

BACKGROUND

Despite many recent advances in browser technology, web browsers generally remain lacking in their ability to perform complex-computation intensive tasks. To address this and other limitations, some web browsers may offload some or all of their tasks/processing to a remote server. For example, some web browsers (e.g., Opera™ Mini) may be configured to request web pages from servers that process and compress the web pages into images files before sending them to the browser. On such systems, the browser simply receives and renders the image, relying on the server to perform nearly all of the processing/tasks associated with displaying the page.

Other web browsers (e.g., Amazon silk) may use a split architecture in which only some of the tasks/processing is offloaded to a server. However, this split architecture generally requires the use of predefined servers and proprietary browsers. Moreover, web browsers (whether proprietary or not) are not always fully informed of the tasks that have already been performed, or if the pre-processed results are current (e.g., in view of recent updates/changes to the content, etc.). Without mechanisms for ensuring the validity of the pre-processed code, a browser is unable to determine whether the code has been efficiently encoded and/or can otherwise be trusted to perform as required to render the associated page.

SUMMARY

The various aspects include methods of processing content in a browser, including receiving in the browser content including one or more pre-performed operations, each associated with a signature, using a signature verification process to verify the signature associated with at least one of the pre-performed operations, performing a first operation when the signature verification process confirms the signature associated with the pre-performed operation, and performing a second operation when the signature verification process does not confirm the signature associated with the pre-performed.

In an aspect, performing a first operation includes incorporating the pre-performed operation. In a further aspect, performing a first operation includes skipping a browser operation associated with the pre-performed operation. In a further aspect, performing a first operation includes altering a browser operation associated with the pre-performed operation. In a further aspect, performing a second operation includes performing a browser operation associated with the pre-performed operation. In a further aspect, using a signature verification process to verify a signature associated with the pre-performed operation includes determining whether a browser operation associated with the pre-performed operation may be skipped or performed differently to achieve better results. In a further aspect, the method includes performing tool operations on code corresponding to web page content to generate at least one pre-performed operation, and signing the pre-performed operations. In a further aspect, performing tool operations on code corresponding to web page content to generate at least one pre-performed operation includes performing tool operations within the browser. In a further aspect, receiving content including one or more pre-performed operations each associated with a signature includes retrieving signed pre-processed code from a memory of a computing device on which the browser is executing. In a further aspect, the method includes storing a result of the first or second operation in the memory of the computing device. In a further aspect, performing tool operations on code corresponding to web page content to generate at least one pre-performed operation includes performing tool operations in an offline tool, the method further including sending the signed pre-performed operations to the browser. In a further aspect, performing tool operations on code corresponding to web page content to generate at least one pre-performed operation includes performing tool operations in a server, the method further including sending the signed pre-performed operations to a computing device on which the browser is executing. In a further aspect, performing tool operations on code corresponding to web page content to generate at least one pre-performed operation includes generating JavaScript. In a further aspect, performing tool operations on code corresponding to web page content to generate at least one pre-performed operation includes generating a cascading style sheet. In a further aspect, performing tool operations on code corresponding to web page content to generate at least one pre-performed operation includes performing a source to source transformation. In a further aspect, performing tool operations on code corresponding to web page content includes marking portions of a cascading style sheet that are not used. In a further aspect, performing tool operations on code corresponding to web page content to generate at least one pre-performed operation includes performing tool operations on code corresponding to an executable script in the web page content to generate at least one pre-performed operation. In a further aspect, performing tool operations on code corresponding to an executable script in the web page content to generate at least one pre-performed operation includes pre-processing a portion of the web page content. In a further aspect, the method further includes including the signed pre-processed portion of the code within web page content, and sending the content to a computing device on which the browser is operating. In a further aspect, signing the pre-processed code is accomplished by a validator. In a further aspect, signing the pre-processed code includes providing a signature that certifies that certain rules have been obeyed in the pre-processing operation.

Further aspects include a computing device that includes means for receiving content including one or more pre-performed operations, each associated with a signature, means for using a signature verification process to verify the signature associated with at least one of the pre-performed operations, means for performing a first operation when the signature verification process confirms the signature associated with the pre-performed operation, and means for performing a second operation when the signature verification process does not confirm the signature associated with the pre-performed. In an aspect, means for performing a first operation includes means for incorporating the pre-performed operation. In a further aspect, means for performing a first operation includes means for skipping a browser operation associated with the pre-performed operation. In a further aspect, means for performing a first operation includes means for altering a browser operation associated with the pre-performed operation. In a further aspect, means for performing a second operation includes means for performing a browser operation associated with the pre-performed operation. In a further aspect, means for using a signature verification process to verify a signature associated with the pre-performed operation includes means for determining whether a browser operation associated with the pre-performed operation may be skipped or performed differently to achieve better results. In a further aspect, the device further includes means for performing tool operations on code corresponding to web page content to generate at least one pre-performed operation, and means for signing the pre-performed operations. In a further aspect, means for performing tool operations on code corresponding to web page content to generate at least one pre-performed operation includes means for performing tool operations within a browser application executing on the computing device. In a further aspect, means for receiving content including one or more pre-performed operations each associated with a signature includes means for retrieving signed pre-processed code from the memory. In a further aspect, the computing device includes means for storing a result of the first or second operation in the memory. In a further aspect, means for performing tool operations on code corresponding to web page content to generate at least one pre-performed operation includes means for generating JavaScript. In a further aspect, means for performing tool operations on code corresponding to web page content to generate at least one pre-performed operation includes means for generating a cascading style sheet. In a further aspect, means for performing tool operations on code corresponding to web page content to generate at least one pre-performed operation includes means for performing a source to source transformation. In a further aspect, means for performing tool operations on code corresponding to web page content includes means for marking portions of a cascading style sheet that are not used. In a further aspect, means for performing tool operations on code corresponding to web page content to generate at least one pre-performed operation includes means for performing tool operations on code corresponding to an executable script in the web page content to generate at least one pre-performed operation. In a further aspect, means for performing tool operations on code corresponding to an executable script in the web page content to generate at least one pre-performed operation includes means for pre-processing a portion of the web page content. In a further aspect, means for signing the pre-processed code includes means for signing the pre-processed code in a validator application executing on the computing device. In a further aspect, means for signing the pre-processed code includes means for generating a signature that certifies that certain rules have been obeyed in the pre-processing operation.

Further aspects include a server that includes means for receiving web page content, means for performing tool operations on code corresponding to portions of the web page content to generate at least one pre-performed operation, means for signing the generated pre-performed operations, means for including the signed pre-processed operations within the web page content, and means for sending the web page content to a computing device. In an aspect, means for performing tool operations on code corresponding to web page content to generate at least one pre-performed operation includes means for generating JavaScript. In a further aspect, means for performing tool operations on code corresponding to web page content to generate at least one pre-performed operation includes means for generating a cascading style sheet. In a further aspect, means for performing tool operations on code corresponding to web page content to generate at least one pre-performed operation includes means for performing a source to source transformation. In a further aspect, means for performing tool operations on code corresponding to web page content includes means for marking portions of a cascading style sheet that are not used. In a further aspect, means for performing tool operations on code corresponding to web page content to generate at least one pre-performed operation includes means for performing tool operations on code corresponding to an executable script in the web page content to generate at least one pre-performed operation. In a further aspect, means for signing the pre-processed code includes means for providing a signature that certifies that certain rules have been obeyed in the pre-processing operation.

Further aspects include a computing device that includes a memory, and a processor coupled to the memory, in which the processor is configured with processor-executable instructions to perform operations including receiving content that includes one or more pre-performed operations, each associated with a signature, using a signature verification process to verify the signature associated with at least one of the pre-performed operations, performing a first operation when the signature verification process confirms the signature associated with the pre-performed operation, and performing a second operation when the signature verification process does not confirm the signature associated with the pre-performed. In an aspect, the processor is configured with processor-executable instructions to perform operations such that performing a first operation includes incorporating the pre-performed operation. In a further aspect, the processor is configured with processor-executable instructions to perform operations such that performing a first operation includes skipping a browser operation associated with the pre-performed operation. In a further aspect, the processor is configured with processor-executable instructions to perform operations such that performing a first operation includes altering a browser operation associated with the pre-performed operation. In a further aspect, the processor is configured with processor-executable instructions to perform operations such that performing a second operation includes performing a browser operation associated with the pre-performed operation. In a further aspect, the processor is configured with processor-executable instructions to perform operations such that using a signature verification process to verify a signature associated with the pre-performed operation includes determining whether a browser operation associated with the pre-performed operation may be skipped or performed differently to achieve better results. In a further aspect, the processor is configured with processor-executable instructions to perform operations further including performing tool operations on code corresponding to web page content to generate at least one pre-performed operation, and signing the pre-performed operations. In a further aspect, the processor is configured with processor-executable instructions to perform operations such that performing tool operations on code corresponding to web page content to generate at least one pre-performed operation includes performing tool operations within a browser executing on the computing device. In a further aspect, the processor is configured with processor-executable instructions to perform operations such that receiving content including one or more pre-performed operations each associated with a signature includes retrieving signed pre-processed code from the memory. In a further aspect, the processor is configured with processor-executable instructions to perform operations further including storing a result of the first or second operation in the memory. In a further aspect, the processor is configured with processor-executable instructions to perform operations such that performing tool operations on code corresponding to web page content to generate at least one pre-performed operation includes generating JavaScript. In a further aspect, the processor is configured with processor-executable instructions to perform operations such that performing tool operations on code corresponding to web page content to generate at least one pre-performed operation includes generating a cascading style sheet. In a further aspect, the processor is configured with processor-executable instructions to perform operations such that performing tool operations on code corresponding to web page content to generate at least one pre-performed operation includes performing a source to source transformation. In a further aspect, the processor is configured with processor-executable instructions to perform operations such that performing tool operations on code corresponding to web page content includes marking portions of a cascading style sheet that are not used. In a further aspect, the processor is configured with processor-executable instructions to perform operations such that performing tool operations on code corresponding to web page content to generate at least one pre-performed operation includes performing tool operations on code corresponding to an executable script in the web page content to generate at least one pre-performed operation. In a further aspect, the processor is configured with processor-executable instructions to perform operations such that performing tool operations on code corresponding to an executable script in the web page content to generate at least one pre-performed operation includes pre-processing a portion of the web page content. In a further aspect, the processor is configured with processor-executable instructions to perform operations such that signing the pre-processed code includes signing the pre-processed code in a validator executing on the computing device. In a further aspect, the processor is configured with processor-executable instructions to perform operations such that signing the pre-processed code includes providing a signature that certifies that certain rules have been obeyed in the pre-processing operation.

Further aspects include a server that includes a memory, and a processor coupled to the memory, in which the processor is configured with processor-executable instructions to perform operations including receiving web page content, performing tool operations on code corresponding to portions of the web page content to generate at least one pre-performed operation, signing the generated pre-performed operations, including the signed pre-processed operations within the web page content, and sending the web page content including the signed pre-processed operations to a computing device. In an aspect, the processor is configured with processor-executable instructions to perform operations such that performing tool operations on code corresponding to web page content to generate at least one pre-performed operation includes generating JavaScript. In a further aspect, the processor is configured with processor-executable instructions to perform operations such that performing tool operations on code corresponding to web page content to generate at least one pre-performed operation includes generating a cascading style sheet. In a further aspect, the processor is configured with processor-executable instructions to perform operations such that performing tool operations on code corresponding to web page content to generate at least one pre-performed operation includes performing a source to source transformation. In a further aspect, the processor is configured with processor-executable instructions to perform operations such that performing tool operations on code corresponding to web page content includes marking portions of a cascading style sheet that are not used. In a further aspect, the processor is configured with processor-executable instructions to perform operations such that performing tool operations on code corresponding to web page content to generate at least one pre-performed operation includes performing tool operations on code corresponding to an executable script in the web page content to generate at least one pre-performed operation. In a further aspect, the processor is configured with processor-executable instructions to perform operations such that signing the pre-processed code includes generating a signature that certifies that certain rules have been obeyed in the pre-processing operation.

Further aspects include a non-transitory computer readable storage medium having stored thereon processor-executable software instructions configured to cause a processor to perform operations for processing content in a browser, the operations including receiving content including one or more pre-performed operations, each associated with a signature, using a signature verification process to verify the signature associated with at least one of the pre-performed operations, performing a first operation when the signature verification process confirms the signature associated with the pre-performed operation, and performing a second operation when the signature verification process does not confirm the signature associated with the pre-performed. In an aspect, the stored processor-executable software instructions are configured to cause a processor to perform operations such that performing a first operation includes incorporating the pre-performed operation. In a further aspect, the stored processor-executable software instructions are configured to cause a processor to perform operations such that performing a first operation includes skipping a browser operation associated with the pre-performed operation. In a further aspect, the stored processor-executable software instructions are configured to cause a processor to perform operations such that performing a first operation includes altering a browser operation associated with the pre-performed operation. In a further aspect, the stored processor-executable software instructions are configured to cause a processor to perform operations such that performing a second operation includes performing a browser operation associated with the pre-performed operation. In a further aspect, the stored processor-executable software instructions are configured to cause a processor to perform operations such that using a signature verification process to verify a signature associated with the pre-performed operation includes determining whether a browser operation associated with the pre-performed operation may be skipped or performed differently to achieve better results. In a further aspect, the stored processor-executable software instructions are configured to cause a processor to perform operations further including performing tool operations on code corresponding to web page content to generate at least one pre-performed operation, and signing the pre-performed operations. In a further aspect, the stored processor-executable software instructions are configured to cause a processor to perform operations such that performing tool operations on code corresponding to web page content to generate at least one pre-performed operation includes performing tool operations within the browser. In a further aspect, the stored processor-executable software instructions are configured to cause a processor to perform operations such that receiving content including one or more pre-performed operations each associated with a signature includes retrieving signed pre-processed code from a memory of a computing device on which the browser is executing. In a further aspect, the stored processor-executable software instructions are configured to cause a processor to perform operations further including storing a result of the first or second operation in the memory of the computing device. In a further aspect, the stored processor-executable software instructions are configured to cause a processor to perform operations such that performing tool operations on code corresponding to web page content to generate at least one pre-performed operation includes generating JavaScript. In a further aspect, the stored processor-executable software instructions are configured to cause a processor to perform operations such that performing tool operations on code corresponding to web page content to generate at least one pre-performed operation includes generating a cascading style sheet. In a further aspect, the stored processor-executable software instructions are configured to cause a processor to perform operations such that performing tool operations on code corresponding to web page content to generate at least one pre-performed operation includes performing a source to source transformation. In a further aspect, the stored processor-executable software instructions are configured to cause a processor to perform operations such that performing tool operations on code corresponding to web page content includes marking portions of a cascading style sheet that are not used. In a further aspect, the stored processor-executable software instructions are configured to cause a processor to perform operations such that performing tool operations on code corresponding to web page content to generate at least one pre-performed operation includes performing tool operations on code corresponding to an executable script in the web page content to generate at least one pre-performed operation. In a further aspect, the stored processor-executable software instructions are configured to cause a processor to perform operations such that performing tool operations on code corresponding to an executable script in a web page content to generate at least one pre-performed operation includes pre-processing a portion of the web page content. In a further aspect, the stored processor-executable software instructions are configured to cause a processor to perform operations such that signing the pre-processed code includes signing the pre-processed code in a computing device on which a validator is executing. In a further aspect, the stored processor-executable software instructions are configured to cause a processor to perform operations such that signing the pre-processed code includes providing a signature that certifies that certain rules have been obeyed in the pre-processing operation.

Further aspects include a non-transitory computer readable storage medium having stored thereon server-executable software instructions configured to cause a server to perform operations including receiving web page content, performing tool operations on code corresponding to portions of the web page content to generate at least one pre-performed operation, signing the generated pre-performed operations, including the signed pre-processed operations within the web page content, and sending the web page content including the signed pre-processed operations to a computing device, and the server processor is configured with server-executable instructions to perform operations including performing tool operations on code corresponding to web page content to generate at least one pre-performed operation, and signing the pre-performed operations.

In an aspect, the stored server-executable software instructions are configured to cause a server to perform operations such that performing tool operations on code corresponding to web page content to generate at least one pre-performed operation includes generating JavaScript. In a further aspect, the stored server-executable software instructions are configured to cause a server to perform operations such that performing tool operations on code corresponding to web page content to generate at least one pre-performed operation includes generating a cascading style sheet. In a further aspect, the stored server-executable software instructions are configured to cause a server to perform operations such that performing tool operations on code corresponding to web page content to generate at least one pre-performed operation includes performing a source to source transformation. In a further aspect, the stored server-executable software instructions are configured to cause a server to perform operations such that performing tool operations on code corresponding to web page content includes marking portions of a cascading style sheet that are not used. In a further aspect, the stored server-executable software instructions are configured to cause a server to perform operations such that performing tool operations on code corresponding to web page content to generate at least one pre-performed operation includes performing tool operations on code corresponding to an executable script in the web page content to generate at least one pre-performed operation. In a further aspect, the stored server-executable software instructions are configured to cause a server to perform operations such that signing the pre-processed code includes providing a signature that certifies that certain rules have been obeyed in the pre-processing operation.

Further aspects include a system that includes a client device including a client memory and a client processor coupled to the client memory, and a server including a server memory and a server processor coupled to the server memory, in which the client processor is configured with processor-executable instructions to perform operations including receiving content that includes one or more pre-performed operations, each associated with a signature, using a signature verification process to verify the signature associated with at least one of the pre-performed operations, performing a first operation when the signature verification process confirms the signature associated with the pre-performed operation, and performing a second operation when the signature verification process does not confirm the signature associated with the pre-performed. In an aspect, the client processor is configured with processor-executable instructions to perform operations such that performing a first operation includes incorporating the pre-performed operation. In a further aspect, the client processor is configured with processor-executable instructions to perform operations such that performing a first operation includes skipping a browser operation associated with the pre-performed operation. In a further aspect, the client processor is configured with processor-executable instructions to perform operations such that performing a first operation includes altering a browser operation associated with the pre-performed operation. In a further aspect, the client processor is configured with processor-executable instructions to perform operations such that performing a second operation includes performing a browser operation associated with the pre-performed operation. In a further aspect, the client processor is configured with processor-executable instructions to perform operations such that using a signature verification process to verify a signature associated with the pre-performed operation includes determining whether a browser operation associated with the pre-performed operation may be skipped or performed differently to achieve better results. In a further aspect, the server processor is configured with server-executable instructions such that performing tool operations on code corresponding to web page content to generate at least one pre-performed operation includes generating JavaScript. In a further aspect, the server processor is configured with server-executable instructions such that performing tool operations on code corresponding to web page content to generate at least one pre-performed operation includes generating a cascading style sheet. In a further aspect, the server processor is configured with server-executable instructions such that performing tool operations on code corresponding to web page content to generate at least one pre-performed operation includes performing a source to source transformation. In a further aspect, the server processor is configured with server-executable instructions such that performing tool operations on code corresponding to web page content includes marking portions of a cascading style sheet that are not used. In a further aspect, the server processor is configured with server-executable instructions such that performing tool operations on code corresponding to web page content to generate at least one pre-performed operation includes performing tool operations on code corresponding to an executable script in the web page content to generate at least one pre-performed operation. In a further aspect, the server processor is configured with server-executable instructions such that signing the pre-processed code includes generating a signature that certifies that certain rules have been obeyed in the pre-processing operation. In a further aspect, the server processor is configured with server-executable instructions to perform operations further including the signed pre-processed operations within the web page content, and sending the web page content including the signed pre-processed operations to the client device. In a further aspect, the client processor is configured with processor-executable instructions to perform operations such that receiving content that includes one or more pre-performed operations includes receiving web page content including the signed pre-processed operations from the server.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
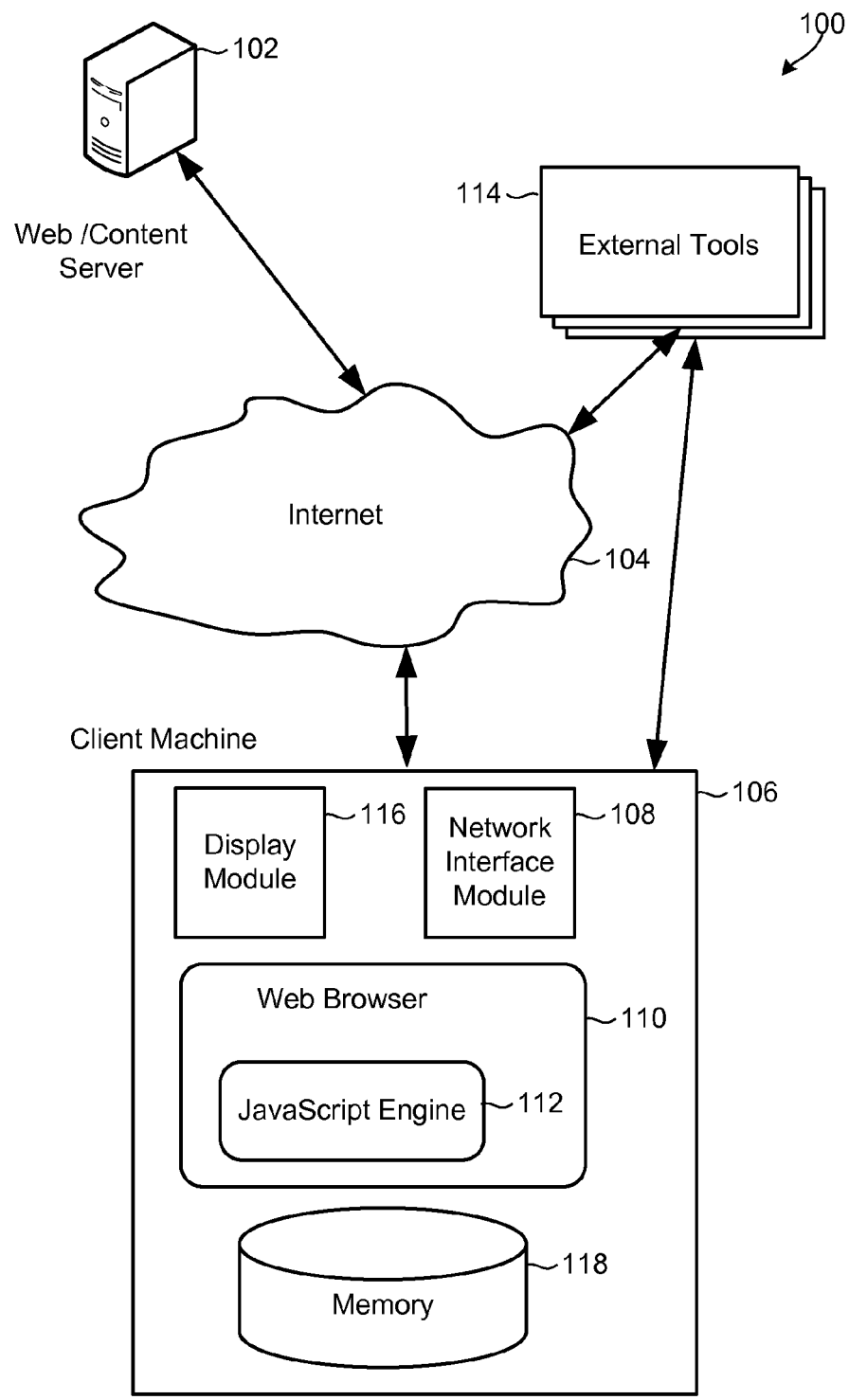
FIG. 1 is a component block diagram illustrating logical components and flows in an example network suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" is used generically herein to refer to any one or all of servers, personal computers, mobile devices, cellular telephones, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, personal computers, and similar personal electronic devices which include a programmable processor configured with a web browser type application. While the various aspects are particularly useful in mobile devices, such as cellular telephones, which have limited processing power, the aspects are generally useful in any computing device that executes scripts and applications written in dynamic and/or scripting languages.

The terms "signing" and "certifying" are used generically herein and may refer to any method of encoding or labeling code, scripts, data, or content such that a client (e.g., web browser) can determine that the code/scripts/data/content was pre-processed by an offline tool or validator, and/or otherwise conforms with the client's requirements.

The term "scripting language" is used generically in this application and may refer to any dynamic language, scripting language, markup language, style sheet, or to any interpreted language used to write programs (herein "code" or "scripts") that are interpreted and/or compiled at runtime. Thus, for the purposes of this application, the term "scripting language" should not be limited to languages that are interpreted from source code or bytecode, or to those that execute along with programs that are traditionally compiled into native machine code. Examples of scripting languages within the scope of this application include, for example, JavaScript, Cascading Style Sheets, HTML, Python, and Ruby, as well as Java and other languages that may be developed in the future.

Various aspects are described herein using JavaScript and related terminology as convenient examples of a scripting language that may be used or addressed by the various embodiments. However, it should be understood that the examples related to JavaScript and other references to the JavaScript language herein are for illustration purposes only, and are not intended to limit the descriptions or the embodiments to that particular type of dynamic scripting language. Therefore the scope of the claims should not be construed as requiring JavaScript unless specifically recited.

It should be understood that the terms "code" and "scripts" are used generically and interchangeably herein, and encompass data and content that may be used or rendered by an application. It should also be understood that the various aspects disclosed herein may be applicable to any part of an application (e.g., browser), including both code and content.

In the various aspects, browser operations may be separated into two portions (an offline tool portion and a browser portion) such that certain browser operations are separated from the other browser operations in both time and space (i.e., performed ahead of time, by a different machine) Signatures/certifications may be used to ensure that the results of these two portions may be safely combined at runtime.

As mentioned above, despite many recent advances in browser technology, web browsers generally remain lacking in their ability to perform complex-computation intensive tasks. The various aspects overcome this and other limitations, by enabling some tasks to be performed ahead of time, using external or "offline" tools that are separate from the web browsers themselves. For example, a browser may configured to allow for certain transformations, optimizations, computations, and/or analysis to be done ahead of time by offline/external tools, the results of which may be received by the browser and used at runtime to improve the browser's performance. The offline/external tool may pre-process the data by, for example, marking portions of cascading style sheets (CSS) that are not used during payload such that the browser can readily identify the portions that are not used. The offline/external tool may also perform source-to-source transformations (e.g., takes in JavaScript and generates optimized JavaScript), and the generated/transformed code (e.g., JavaScript) may be embedded with the content for the browser to process, execute and/or display.

Since both the original code and the following generated code may be in the same format (e.g., both may be JavaScript), a web browser may not be fully informed of the tasks that have already been performed by the external/offline tools, whether the pre-processed tasks are still current (e.g., in view of recent updates/changes to the content, etc.), or whether the pre-performed tasks were performed in such a way so as to not cause faults or violations (e.g., incorrect execution, unconstrained faults, etc.) due to, for example, incompatible assumptions.

For these and other reasons, a browser may be required to perform a number of operations to verify the validity of the generated code before execution. This verification process may require passing a substantial amount of supplemental information (e.g., task and version information, browsers supported, pre-processing methodologies, etc.) between the browser and the offline tool, and/or performing bytecode verification on the entire body of received code (e.g., as mandated when loading Java classes). Passing large amounts of supplemental information adds overhead to the browser. The verification overhead may be more than just performing all phases and ignoring pre-processed data. The extra overhead may cancel benefits of running the offline tool.

Various aspects provide a framework that utilizes a signature or certification that is associated with one or more pre-processed scripts/code/data/content (herein collectively "script" or "code") such that a web browser can verify, confirm, and/or trust the script and skip further processing the associated script by relying on code previously generated and stored in memory by the browser or provided by an offline/external tool.

Various aspects verify, encode, and pass pre-processed code to a browser in a manner that enables the browser to determine the tasks (e.g., transformations, optimizations, compilations, computations, analysis, etc.) that have been pre-processed, and such that the browser can trust that the pre-processed code is trustworthy (i.e., that the pre-processed code will execute correctly), without performing additional processing.

In various aspects, code/data generated by an offline/external tool and included with the rest of the web page content may be embedded with a "verified stamp" or "signature." This signature may identify (e.g., via a verification identifier) the tasks which have been accomplished. This signature may also enable the browser to confirm that the code has been efficiently encoded and may be executed without additional processing or browser verification. Thus, in an aspect, instead of passing a cumbersome amount of supplemental information to the browser, the generated code may be signed with the signature embedded in the code (e.g., in comments, annotations, etc.) such that client applications (e.g., browsers) can readily identify which tasks have been accomplished and trust that the code is safe to execute. In an aspect, the signature may be well defined, structured and efficiently encoded supplemental information.

By embedding the "verified stamp" or "signature" into the code, the various aspects eliminate the need for the browser to perform any additional operations to verify the pre-processed code, reducing web browsing overhead and improving performance.

In an aspect, the use of signatures to confirm and verify previously processed code may also be used by the web browser when storing results of processing a web page in memory. In this aspect, when the browser processes web page scripts while rendering a web page, the processed script may be stored in memory for reuse the next time the page is rendered. Since web pages change frequently, the processor would conventionally have to process the page scripts significantly in order to determine whether the page is the same as previously rendered. The aspects enable the web browser to sign code saved in memory after it has been processed. The browser may then use the signature to determine whether the saved code can be trusted to properly render the page. For example, if the web page content has changed since the last time it was rendered by the web browser, the process of verifying the signature may inform the browser of the change in content, in which case the browser may choose to execute the script instead of reusing previous code retrieved from memory.

The embedding of the stamps/signatures/certifications in pre-processed code may provide an efficient communication protocol between the external/offline tool and the browser, enabling the browser to confirm the safety or trustworthy nature of the received code (i.e., no improper memory accesses, nothing significant has changed since generating the code, the code will not cause malfunctions, etc.).

As mentioned above, browser operations may be separated into two portions (an offline tool portion and a browser portion) such that certain browser operations are separated from the other operations in both time and space (e.g., performed ahead of time, or by a different machine) In an aspect, an offline tool (e.g., a tool that performs static and/or dynamic analysis) may generate pre-processed code, sign the code to certify that the code obeys certain rules, and embed the signed code into the browser. In an aspect, pre-processed code may be validated by an external validator, which may sign the results of the offline tool (i.e., the pre-processed code). The results may be signed with a private key or by including known keywords in the form of tags, attributes, formatted comments, etc. The browser may use cryptographic credentials to determine whether the code was processed by a known external/offline tool, whether the code is current, and/or whether the code is safe or trustworthy. For example, the browser may use a validator public key to validate the embedded signature to determine whether the code was in fact processed by a trusted validator or the expected version of it. If the browser validates the signature in the code, the browser may trust that the code is safe to execute without spending any additional overhead, requesting additional information or performing any of the additional processing/analysis typically required for code verifications. This process enables the browser to rely on and use the pre-processed code, thereby reducing processing overheads in the client device and improving performance.

In aspects in which the web browser stores processed code and uses an embedded signature to verify that the stored code is trustworthy, the process proceeds in a similar manner except that the browser itself serves as the validator.

FIG. 1 illustrates an example network 100 that may be used for reducing web browsing overheads with external code certification in accordance with the various aspects. The network 100 may include a web/content server 102 that delivers content to a client machine 106 via the Internet 104. The client machine 106 may include a network interface module 108, a display module 116, a memory 118, and a web browser 110. The browser 110 may include a JavaScript engine 112 for interpreting and executing JavaScript.

The network 100 may also include offline/external tools 114 configured to perform browser operations. The external/offline tool 114 may be implemented anywhere in the network 100, such as on the web server 102, a separate server, a proxy, or on the client machine 106. The external/offline tool 114 may be implemented as an independent process or as a part of the browser 110. The external/offline tool 114 may be configured to generate to code (e.g., may be a preprocessor) or to send static pre-processed code (e.g., code provided by the developer, results of a previous execution session of the browser, etc.) to the browser 110.

The browser 110 may be configured to offload certain browser operations (e.g., transforms, optimizations, etc.) to the offline/external tools 114 such that the offloaded operations are separated from the other operations in time and/or space (i.e., performed ahead of time, by a different machine). The external/offline tool 114 may compile the Javascript, generate code for one or more platforms (e.g., android, etc.), and sign the generated code with a signature. The code generated by the offline/external tools 114 may be the same type of code used by the browser (i.e., performs source to source transformation). For example, the offline tool may take JavaScript code as input and generate optimized (and signed) JavaScript code as its output. The generated code may be complied executable code (e.g., a series of fully compiled functions). The existence of the signature allows the browser 110 to call the generated code directly and trust that its execution will result in the exact same operation as if the JavaScript code was generated by the browser 110 itself (e.g., via the JavaScript engine 112). This effectively eliminates virtually all the costs of JavaScript compilation from the browser/user perspective.

In an aspect, the external/offline tool 114 may be part of browser 110 and include a preprocessor that pre-processes scripts when the client machine 106 detects that it is connected to a power source and/or is idle.

In an aspect, the external/offline tool 114 may sign and store the preprocessed code in memory for later use.

In an aspect, signatures may be embedded in the generated code so that they do not impact browsers that do not support the signatures. In an aspect, the offline/external tool may be configured to embed the code such that the embedded code can be ignored by an unmodified JavaScript engine and processed by JavaScript engines modified to understand the embedded code. In an aspect, the offline/external tool may be configured to embed the code in comments or annotations.

Figure 2A:
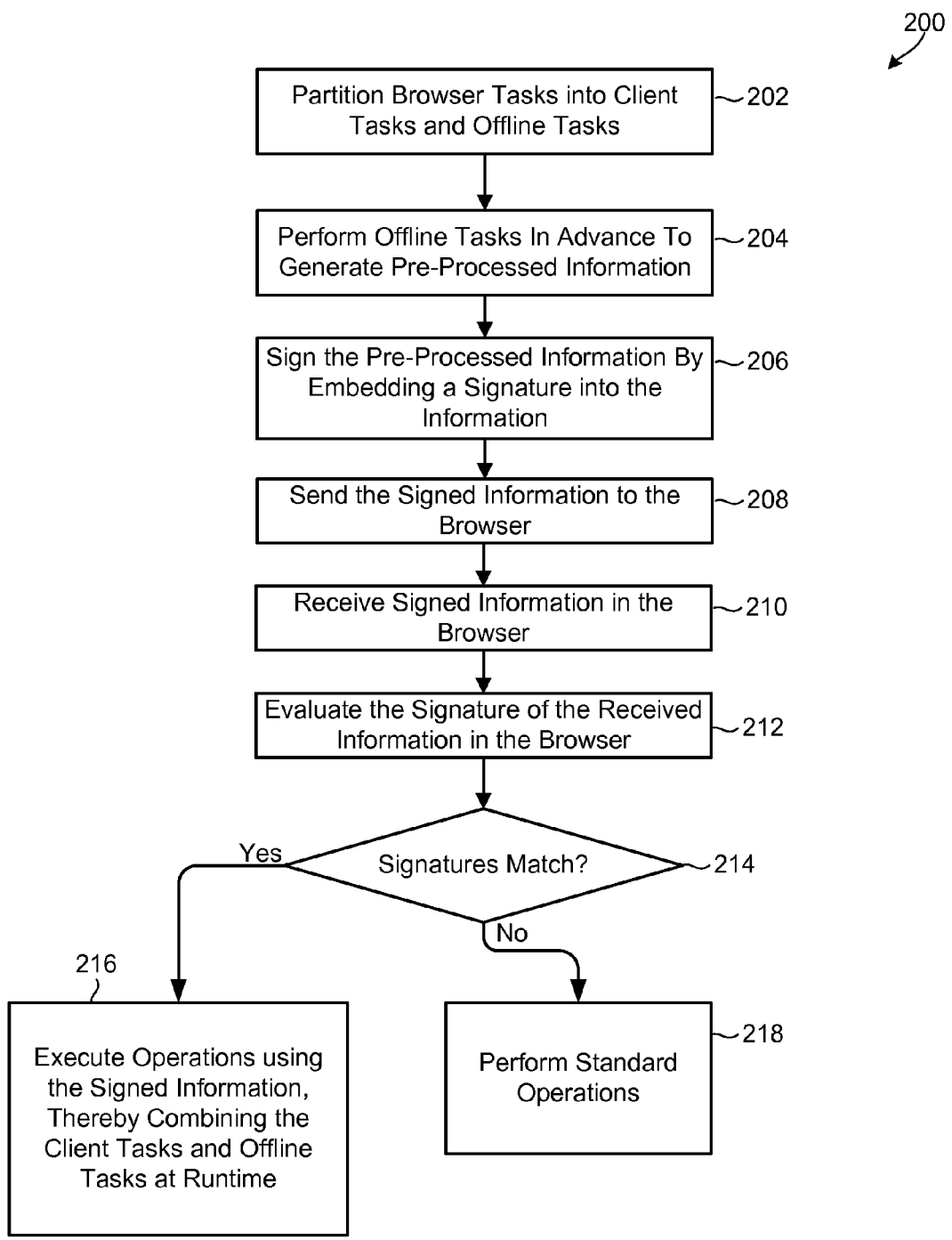
FIGS. 2A-B are process flow diagrams of aspect methods for reducing web browsing overheads with external code certification.

FIG. 2A illustrates an aspect method 200 of reducing web browsing overheads by using an external code certification. In block 202, browser operations may be separated into an offline tool portion and a browser portion. In block 204, an offline tool may perform the offline tool portions in advance of the browser's execution of the code and generate pre-processed code. In block 206, the offline tool may sign the pre-processed code by embedding a signature into the code. In an aspect, as part of block 206, the pre-processed code may be validated by a validator, which may sign the results of the offline tool (i.e., the pre-processed code) with a private key or other verifiable key used in a hash-type signature operation. Any of a variety of known signing processes may be used in generating the signature based on the content of the processed code. By signing the processed code, a receiver device is able to verify the signature by performing the same or a parallel process on that code when it is received. Alternatively, the signature may be based on the pre-processed code. In block 208, the signed pre-processed code may be sent to the browser along with the rest of the web content.

In block 210, the browser may receive the signed code along with the rest of the web page content. In block 212, the browser may evaluate the signatures in the received code. For example, as part of block 212, the browser may use a validator public key to validate if the code was in fact processed by a trusted validator. Also or alternatively, the browser may perform a hash function on the script in the web page that has been pre-processed to obtain a hash value characteristic of that code. This verification process can confirm both that the pre-processed code corresponds to the non-processed script in the web page and that the pre-processing was performed by a trustworthy offline tool.

In determination block 214, the browser may determine whether the signatures match. If the browser determines that the generated and embedded signatures match (i.e., determination block 214="Yes"), in block 216, the browser may combine the client portions and offline tool portions at runtime and execute the signed code trusting in the security of the code. If the browser determines that the signatures do not match (i.e., determination block 214="No"), in block 218, the browser may render the page by executing scripts as if the pre-processed code had not been provided. Thus, the embedding of signatures allows certain browser operations to be separated from the other operations in both time and space (i.e., performed ahead of time, by a different machine) by ensuring that the results of the two portions can be safely combined at runtime by enabling the browser to trust that the code is safe (e.g., correct operation, no unauthorized memory accesses, etc.).

Figure 2B:
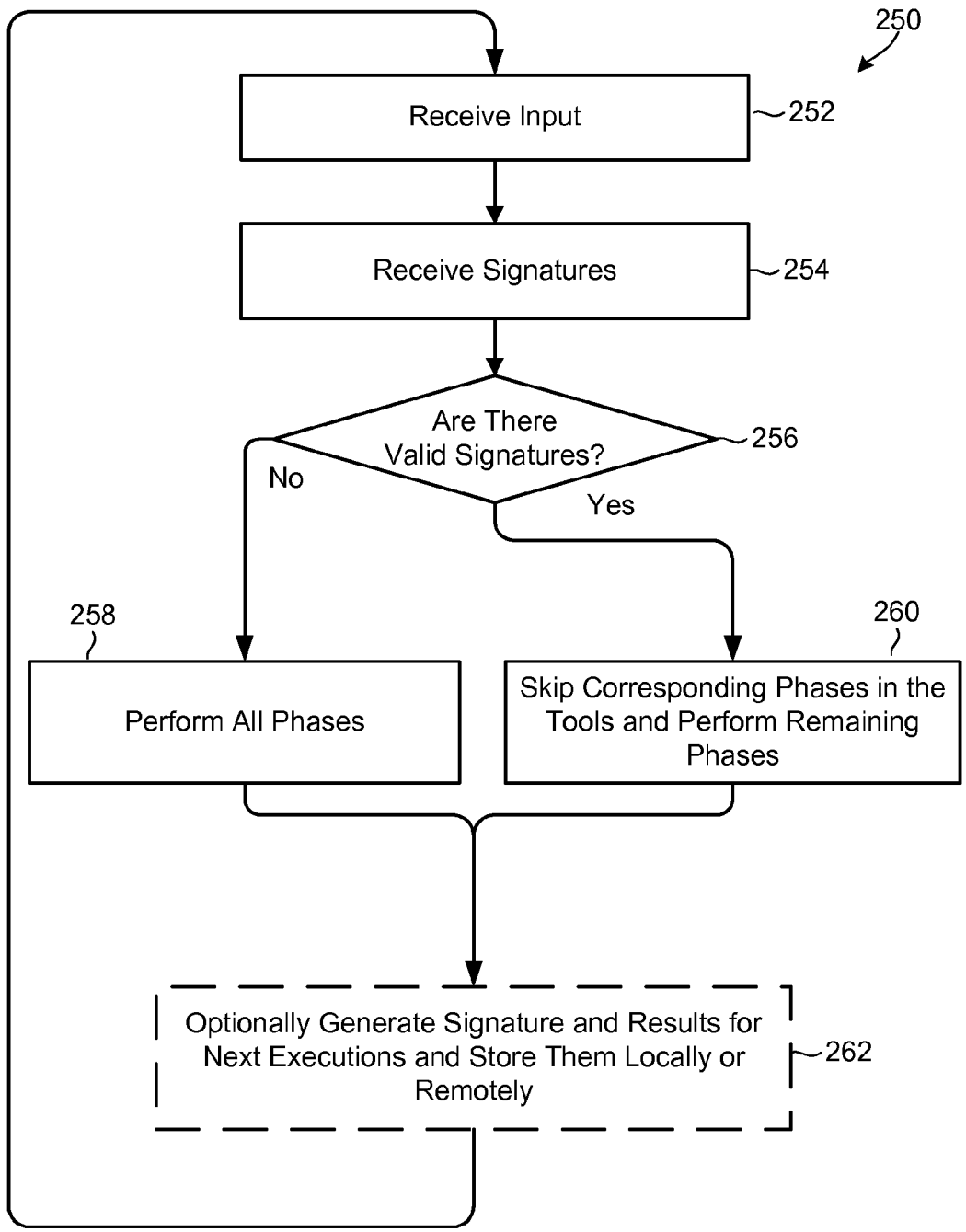

FIG. 2B illustrates another aspect method 250 of reducing web browsing overheads by using an external code certification. In block 252, a browser may receive input from an offline tool portion. In block 254, the browser may receive singed pre-processed code/content. In determination block 256, the browser may determine there are any valid signatures in the received singed pre-processed code/content (e.g., via determining that the generated and embedded signatures match). If it is determined that there are no valid signatures (i.e., determination block 256="No"), in block 258, the browser may render the page by performing full operations on all the received code (e.g., for each phases) as if the pre-processed code had not been provided. If it is determined that there are valid signatures (i.e., determination block 256="Yes"), in block 260, the browser may render the page by executing the pre-processed code, and only performing full verification of the unsigned portions of the code/content. In optional block 262, the browser may optionally generate signatures and results for the next set of executions, and store them locally or remotely for later retrieval. Any of a variety of known signing processes may be used in generating the signature, which may be based on the content of the processed code. By signing the processed code, a receiver device is able to verify the signature by performing the same or a parallel process on that code when it is accessed from memory or received as part of an accessed webpage.

Figure 3:
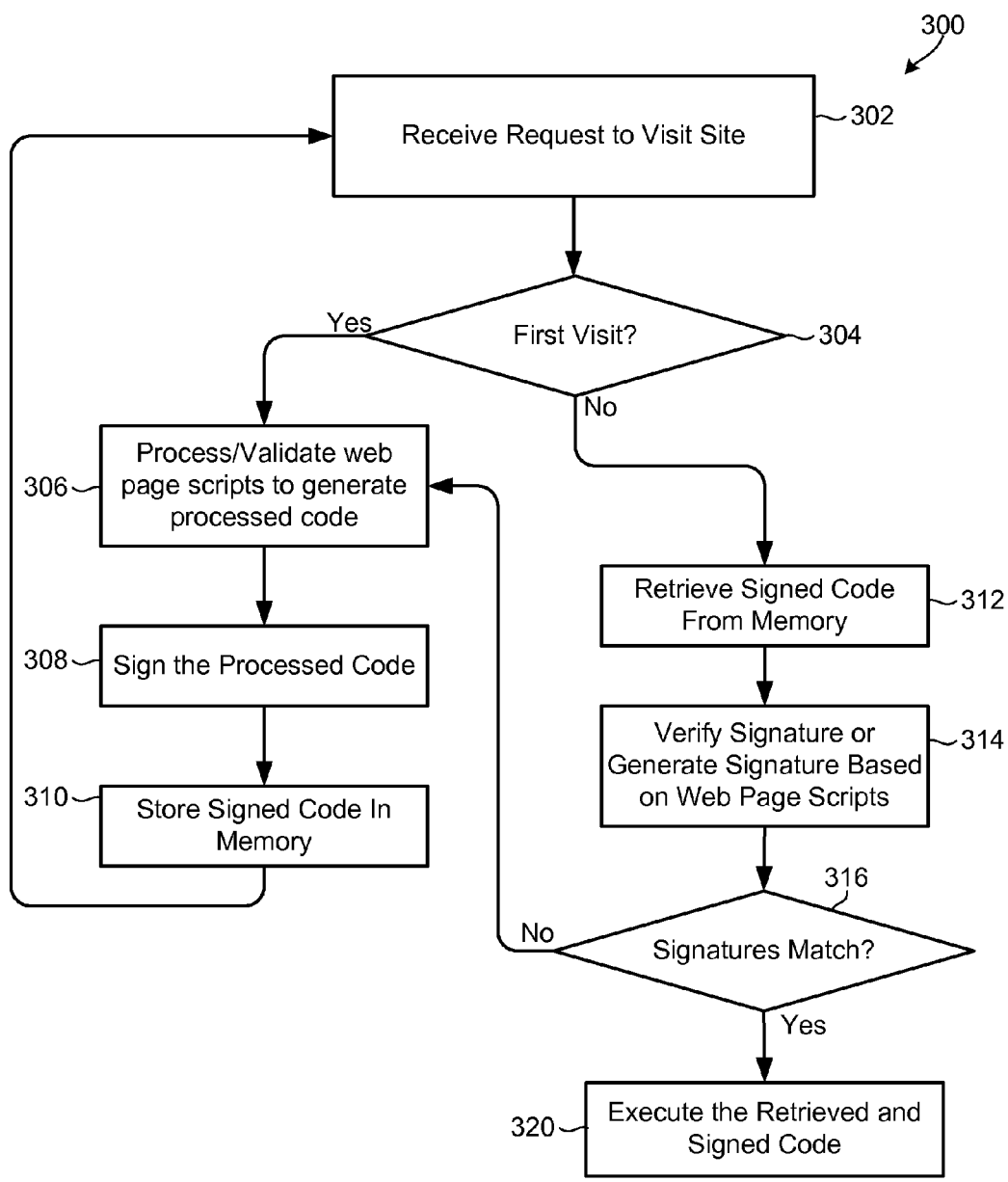
FIG. 3 is a process flow diagram of another aspect method for reducing web browsing overheads with external code certification.

FIG. 3 illustrates another aspect method 300 of reducing web browsing overheads by using the code signing methods in order to save processed code in a manner that allows the browser to determine at a later time whether it can be reused when rendering the same page. In block 302, the browser may receive a request to visit a particular website. In determination block 304, the browser may determine whether this is the first time that the site has been visited in a given time window. If the browser determines that it is the first visit (i.e., determination block 304="Yes"), in block 306, the browser may process the web page content using conventional methods. In block 308, the browser may sign the processed code and include or embed the generated signature. In block 310, the signed processed code may be stored in a memory of the device on which the web browser is acting.

If the browser determines that it is not the first visit to the web page (i.e., determination block 304="No"), in block 312, the signed code may be retrieved from memory. In block 314, the browser may verify the signature included with or embedded in the code. This process may involve performing the signature process (e.g., a hash function) on the corresponding script within the web page content to generate another signature. In determination block 316, the browser may determine whether the signatures match. If the signatures are generated based on the scripts within the web page that was pre-processed, comparing the signatures will enable the browser to quickly confirm whether the stored previously processed code was generated by executing the same scripts as in the currently downloaded web page. If the browser determines that the signatures match (i.e., determination block 316="Yes"), in block 320, the browser may execute the signed code having verified that the stored previously processed code was generated by processing the same scripts as in the current web page content. Thus, a signature match enables the browser to trust that execution of the previously stored code will properly render the current webpage. If the browser determines that the signatures do not match (i.e., determination block 316="No"), in block 318, the browser may perform the operations of executing scripts to render the web page in block 306 as if the previously processed code was not stored in memory.

In a further aspect, the operations of method 300 may be combined with those of method 200 so that the web browser validates and uses pre-processed code supplied by off line tools with the web page content, stores the results of processing web page scripts with a signature, and reuses previously stored code when its associated signature is validated.

Various aspects may be configured such that the non-existence of a signature in the code indicates to the JavaScript engine that the scripts in the web page has not yet been processed and therefore must be processed by the browser. In an aspect, the signatures may indicate to the browser that only a restricted subset of the available language features that are amenable to optimization have been used to generate the code and that the execution of the code is will not result in certain features being used. In an aspect, the signatures may indicate to the browser that an augmented set of the available language features (e.g., type checking) have been utilized to generate the code and that the browser can forgo performing similar operations.

In an aspect, the offline/external tool may be a compiler that pre-compiles the code.

It should be understood that the various aspects are not concerned with security, but ensuring the validity of previous operations or optimizations. The various aspect methods are not focused solely on executable code and JavaScript® code, and may be applied to any part of the browser, both code and content.

Various aspects may partition a tool (e.g., JavaScript compiler, parser, CSS processor, layout engine, etc.) into off-line and on-line parts. The offline part may perform a set of operations on the code and generates one or multiple signatures that capture the performed operations. The online part may check the signature(s) and decide whether a certain operation can be skipped, may be performed in a simplified or approximate form, may be performed differently to achieve better results, and/or if the client may otherwise take advantage of the pre-validated code. If not, the online part may perform the same operations (potentially less optimized) on the input (code or content) again.

One of the benefits provided by the various aspect is the use of signatures as an inexpensive way of determining whether certain operations can be skipped or simplified in the on-line part. The offline part may be implemented on a server or on the client. In an aspect, the offline part may be implemented on the client and executed when the computing device is idle.

Figure 4:
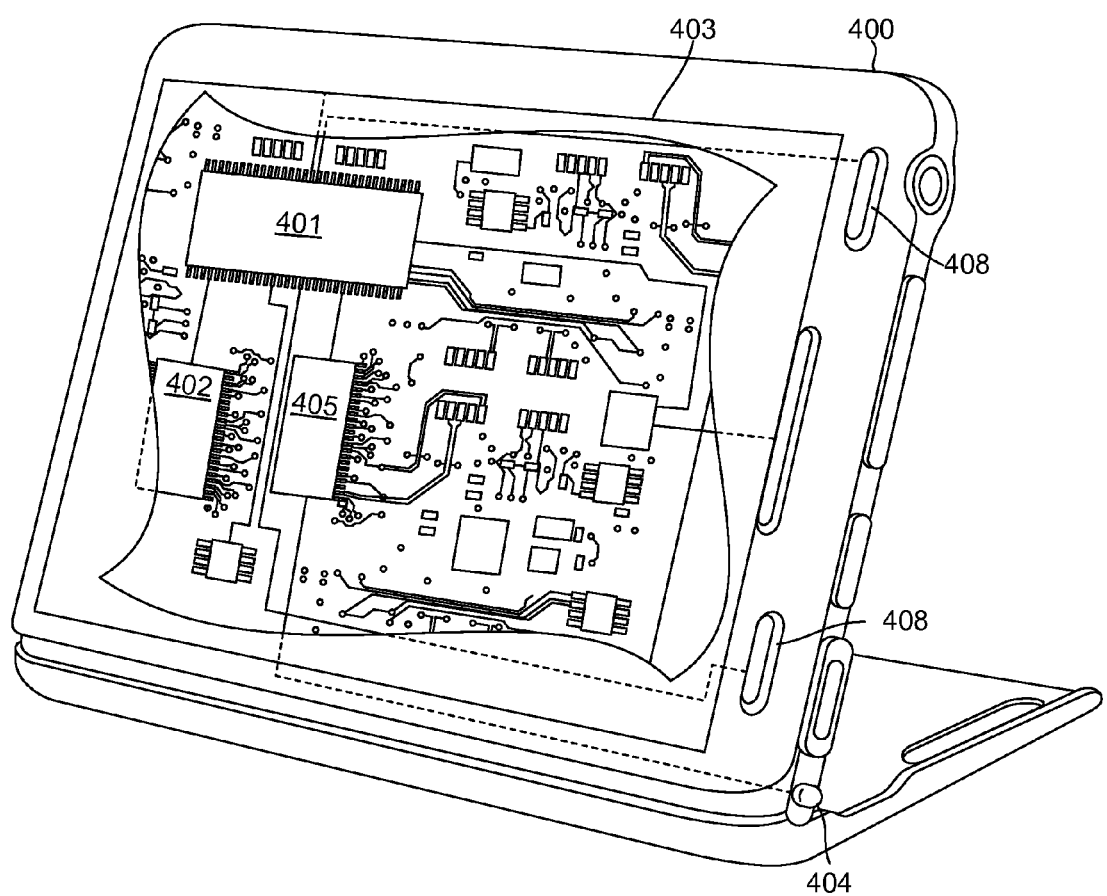
FIG. 4 is an illustration of an example mobile device suitable for use with the various aspects.
Figure 5:
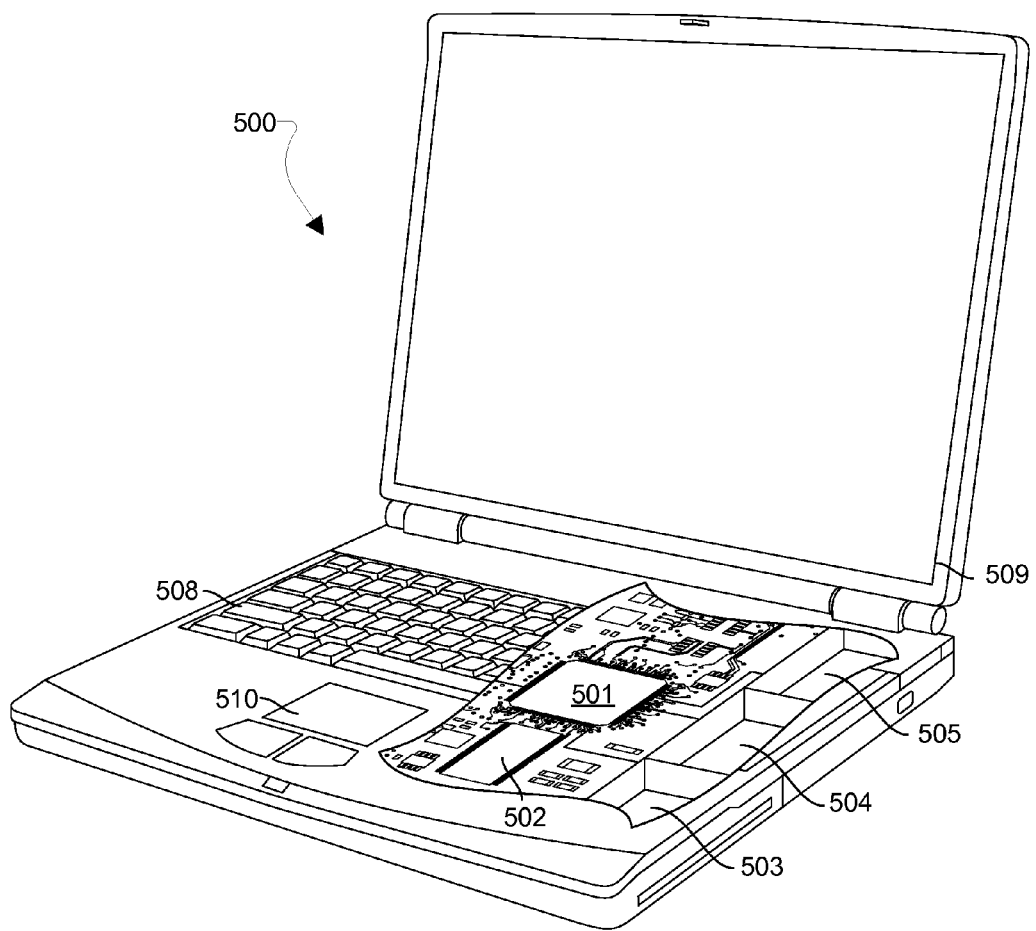
FIG. 5 is an illustration of an example personal computer suitable for use with the various aspects.

The various aspects may be implemented on any of a variety of computing devices. An example of a mobile computing device is illustrated in FIG. 4, and an example of a notebook computer is illustrated in FIG. 5. Typical mobile computing devices 400 will have in common the components illustrated in FIG. 4. For example, mobile computing devices 400 may include a processor 401 coupled to internal memory 402 and a touch surface input device/display 403. The touchscreen display 403, such as a resistive sensing touchscreen, capacitive sensing touchscreen, infrared sensing touchscreen, acoustic/piezoelectric sensing touchscreen, or the like. The various aspects are not limited to any particular type of touchscreen display 403 or touchpad technology. Additionally, the computing device 400 may have an antenna 404 for sending and receiving electromagnetic radiation that is connected to a wireless data link and/or cellular telephone transceiver 405 coupled to the processor 401. Computing devices 400 may also include physical buttons 408 for receiving user inputs.

While the various aspects may provide significant performance enhancements for mobile computing devices, other forms of computing devices, including personal computers and laptop computers, may also benefit from pre-parsing of the dynamic language scripts. Such computing devices typically include the components illustrated in FIG. 5, which illustrates an example personal laptop computer 500. Such a personal computer 500 generally includes a processor 501 coupled to volatile memory 502 and a large capacity non-volatile memory, such as a disk drive 503. The computer 500 may also include a compact disc (CD) and/or DVD drive 504 coupled to the processor 501. The computer device 500 may also include a number of connector ports coupled to the processor 401 for establishing data connections or receiving external memory devices, such as a network connection circuit 505 for coupling the processor 401 to a network. The computer 500 may further be coupled to a keyboard 508, a pointing device such as a mouse 510, and a display 509 as is well known in the computer arts.

Figure 6:
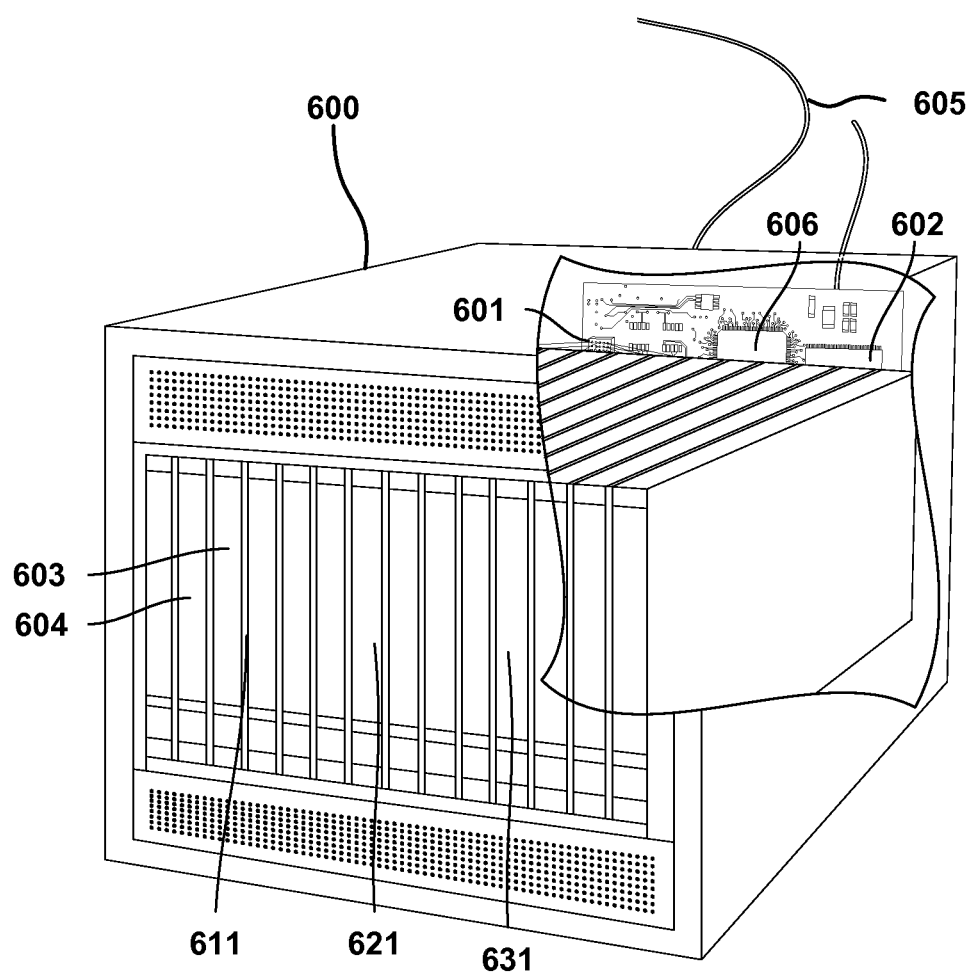
FIG. 6 is an illustration of an example server suitable for use with the various aspects.

The various aspects may also be implemented on any of a variety of commercially available server devices, such as the server 600 illustrated in FIG. 6. Such a server 600 typically includes a processor 601, and may include multiple processor systems 611, 621, 631, one or more of which may be or include multi-core processors. The processor 601 may be coupled to volatile memory 602 and a large capacity nonvolatile memory, such as a disk drive 603. The server 600 may also include a floppy disc drive, compact disc (CD) or DVD disc drive 606 coupled to the processor 601. The server 600 may also include network access ports 604 coupled to the processor 601 for establishing data connections with a network 605, such as a local area network coupled to other broadcast system computers and servers.

The processor 401, 501, 601 may be any programmable microprocessor, microcomputer or multiple processor chip or chips that may be configured by software instructions (applications) to perform a variety of functions, including the functions of the various aspects described herein. In some mobile devices, multiple processors 401, 501, 601 may be provided, such as one processor dedicated to wireless communication functions and one processor dedicated to running other applications. Typically, software applications may be stored in the internal memory 402, 502, 602 before they are accessed and loaded into the processor 401, 501, 601. In some mobile devices, the processor 401, 501, 601 may include internal memory sufficient to store the application software instructions. In some mobile devices, the secure memory may be in a separate memory chip coupled to the processor 401, 501, 601. The internal memory 402, 502, 602 may be a volatile or nonvolatile memory, such as flash memory, or a mixture of both. For the purposes of this description, a general reference to memory refers to all memory accessible by the processor 401, 501, 601, including internal memory 402, 502, 602, removable memory plugged into the mobile device, and memory within the processor 401, 501, 601 itself.

The foregoing method descriptions and the process flow diagrams are provided merely as illustrative examples and are not intended to require or imply that the blocks of the various aspects must be performed in the order presented. As will be appreciated by one of skill in the art the order of steps in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a non-transitory computer-readable or processor-readable storage medium. The steps of a method or algorithm disclosed herein may be embodied in a processor-executable software module, which may reside on a non-transitory processor-readable or computer-readable storage medium. Non-transitory processor-readable and computer-readable media may be any available storage media that may be accessed by a computer or a processor of a computing device. By way of example, and not limitation, such non-transitory processor-readable or computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer or processor of a computing device. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable medium and/or non-transitory computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for processing content in a browser, comprising:

receiving, in the browser, web page content associated with a web page, the web page content including a plurality of operations used to render the web page;

separating the plurality of operations into offline tool operations and browser operations;

receiving, in the browser, one or more pre-performed offline tool operations;

using a signature verification process to verify a signature associated with at least one of the received pre-performed offline tool operations;

rendering the web page, in response to the signature verification process confirming the signature associated with the at least one of the received pre-performed offline tool operations, by performing the offline tool operations and the browser operations that do not correspond to the at least one of the received pre-performed offline tool operations and skipping the performance of the offline tool operations of the plurality of operations that correspond to the at least one of the received pre-performed offline tool operations; and rendering the web page, in response to the signature verification process not confirming the signature associated with the at least one of the received pre-performed offline tool operations, by performing the separated offline tool operations and the browser operations of the plurality of operations.

2. The method of claim 1, further comprising incorporating the at least one of the received pre-performed offline tool operations while rendering the web page by performing the offline tool operations and the browser operations that do not correspond to the at least one of the received pre-performed offline tool operations.

3. The method of claim 1, further comprising altering at least one browser operation of the plurality of operations based on the at least one of the received pre-performed offline tool operations.

4. The method of claim 1, further comprising performing at least one browser operation of the plurality of operations that corresponds to the at least one of the received pre-performed offline tool operations.

5. The method of claim 1, wherein using the signature verification process to verify the signature associated with the at least one of the received pre-performed offline tool operations comprises determining whether at least one browser operation of the plurality of operations corresponding to the at least one of the received pre-performed offline tool operations may be performed differently to achieve better results.

6. The method of claim 1, further comprising:

performing one or more of the offline tool operations to generate the one or more pre-performed offline tool operations received in the browser; and signing the one or more pre-performed offline tool operations.

7. The method of claim 6, wherein performing the one or more offline tool operations to generate the one or more pre-performed offline tool operations comprises performing the one or more offline tool operations in an offline tool, the method further comprising:

sending the signed one or more pre-performed offline tool operations to the browser.

8. The method of claim 6, wherein performing the one or more offline tool operations to generate the one or more pre-performed offline tool operations comprises performing the one or more offline tool operations in an offline tool, the method further comprising:

sending the signed one or more pre-performed offline tool operations to a computing device on which the browser is executing.

9. The method of claim 6, wherein performing the one or more offline tool operations to generate the one or more pre-performed offline tool operations comprises generating JavaScript.

10. The method of claim 6, wherein performing the one or more offline tool operations to generate the one or more pre-performed offline tool operations comprises generating a cascading style sheet.

11. The method of claim 6, wherein performing the one or more offline tool operations to generate the one or more pre-performed offline tool operations comprises performing a source to source transformation.

12. The method of claim 6, wherein performing the one or more offline tool operations to generate the one or more pre-performed offline tool operations comprises marking portions of a cascading style sheet that are not used.

13. The method of claim 6, wherein performing the one or more offline tool operations to generate the one or more pre-performed offline tool operations comprises performing the one or more offline tool operations on an executable script in the web page content to generate the one or more pre-performed offline tool operations.

14. The method of claim 6, wherein signing the one or more of the received pre-performed offline tool operations is accomplished by a validator.

15. The method of claim 6, wherein signing the one or more of the received pre-performed offline tool operations comprises providing a signature that certifies that certain rules have been obeyed in the one or more of the received pre-performed offline tool operations.

16. The method of claim 6, wherein performing the one or more offline tool operations to generate the one or more pre-performed offline tool operations comprises performing the one or more offline tool operations within the browser.

17. The method of claim 16, wherein receiving the web page content associated with the web page further comprises retrieving signed pre-processed code from a memory of a computing device on which the browser is executing.

18. The method of claim 17, further comprising storing a result of the rendering of the web page in the memory of the computing device.

19. The method of claim 16, wherein performing the one or more offline tool operations to generate the one or more pre-performed offline tool operations comprises pre-processing a portion of the web page content.

20. The method of claim 1, further comprising, rendering the web page, in response to the signature verification process not confirming the signature associated with the at least one of the received pre-performed-offline tool operations, by performing all of the offline tool operations and the browser operations of the plurality of operations and without using the at least one of the received pre-performed offline tool operations.

21. A computing device for processing content in a browser, comprising:

means for receiving web page content associated with a web page, the web page content including a plurality of operations used to render the web page;

means for separating the plurality of operations into offline tool operations and browser operations;

means for receiving one or more pre-performed offline tool operations;

means for using a signature verification process to verify a signature associated with at least one of the received pre-performed offline tool operations;

means for rendering the web page, in response to the signature verification process confirming the signature associated with the at least one of the received pre-performed offline tool operations, comprising means for performing the offline tool operations and the browser operations that do not correspond to the at least one of the received pre-performed offline tool operations and means for skipping the performance of the offline tool operations of the plurality of operations that correspond to the at least one of the received pre-performed offline tool operations; and means for rendering the web page, in response to the signature verification process not confirming the signature associated with the at least one of the received pre-performed offline tool operations, comprising means for performing the separated offline tool operations and the browser operations of the plurality of operations.

22. The computing device of claim 21, wherein the means for rendering the webpage, in response to the signature verification process not confirming the signature associated with the at least one of the received pre-performed offline tool operations, comprises means for performing all of the offline tool operations and the browser operations of the plurality of operations and without using the at least one of the received pre-performed offline tool operations.

23. The computing device of claim 21, further comprising means for incorporating the at least one of the received pre-performed offline tool operations while rendering the web page by performing the offline tool operations and the browser operations that do not correspond to the at least one of the received pre-performed offline tool operations.

24. The computing device of claim 21, further comprising means for altering at least one browser operation of the plurality of operations based on the at least one of the received pre-performed offline tool operations.

25. The computing device of claim 21, further comprising means for performing at least one browser operation of the plurality of operations that corresponds to the at least one of the received pre-performed offline tool operations.

26. The computing device of claim 21, wherein means for using the signature verification process to verify the signature associated with the at least one of the received pre-performed offline tool operations comprises means for determining whether at least one browser operation of the plurality of operations corresponding to the at least one of the received pre-performed offline tool operations may be performed differently to achieve better results.

27. The computing device of claim 21, further comprising:
means for performing one or more of the offline tool operations to generate the one or more received pre-performed offline tool operations; and
means for signing the one or more pre-performed offline tool operations.

28. The computing device of claim 27, wherein means for performing the one or more of the offline tool operations to generate the one or more received pre-performed offline tool operations comprises means for generating JavaScript.

29. The computing device of claim 27, wherein means for performing the one or more of the offline tool operations to generate the one or more pre-performed offline tool operations comprises means for generating a cascading style sheet.

30. The computing device of claim 27, wherein means for performing the one or more of the offline tool operations to generate the one or more pre-performed offline tool operations comprises means for performing a source to source transformation.

31. The computing device of claim 27, wherein means for performing the one or more of the offline tool operations to generate the one or more pre-performed offline tool operations comprises means for marking portions of a cascading style sheet that are not used.

32. The computing device of claim 27, wherein means for signing the one or more of the received pre-performed offline tool operations comprises means for signing the one or more of the received pre-performed offline tool operations in a validator application executing on the computing device.

33. The computing device of claim 27, wherein means for signing the one or more of the received pre-performed offline tool operations comprises means for generating a signature that certifies that certain rules have been obeyed in the one or more of the received pre-performed offline tool operations.

34. The computing device of claim 27, wherein means for performing the one or more offline tool operations to generate the one or more pre-performed offline tool operations comprises means for performing the one or more offline tool operations within a browser application executing on the computing device.

35. The computing device of claim 34, wherein means for receiving the web page content associated with the web page further comprises means for retrieving signed pre-processed code from a memory.

36. The computing device of claim 35, further comprising means for storing a result of the rendering of the web page.

37. The computing device of claim 27, wherein means for performing the one or more offline tool operations to generate the one or more pre-performed offline tool operations comprises means for performing the one or more offline tool operations on an executable script in the web page content to generate the one or more pre-performed offline tool operations.

38. The computing device of claim 37, wherein means for performing the one or more offline tool operations on the executable script in the web page content to generate the one or more pre-performed offline tool operations comprises means for pre-processing a portion of the web page content.

39. A server, comprising:
means for performing one or more offline tool operations to generate at least one pre-performed offline tool operation, wherein the one or more offline tool operations are offline tool operations separated from browser operations and wherein the offline tool operations and the browser operations are a plurality of operations included in web page content associated with a web page, wherein the plurality of operations is used to render the web page;
means for signing the generated at least one pre-performed offline tool operation to enable a browser to perform a signature verification process to verify a signature associated with the at least one pre-performed offline tool operation;
means for including the signed at least one pre-performed offline tool operation within the web page content; and
means for sending the web page content to the browser, the browser being configured upon a computing device to render the web page by performing the offline tool operations and the browser operations of the plurality of operations that do not correspond to the at least one pre-performed offline tool operation generated by the server and skipping the performance of the offline tool operations of the plurality of operations that correspond to the at least one pre-performed offline tool operation generated by the server when the signature is verified, and to render the web page by performing the offline tool operations and the browser operations of the plurality of operations when the signature is not verified.

40. The server of claim 39, wherein means for performing the one or more offline tool operations to generate the at least one pre-performed offline tool operation comprises means for generating JavaScript.

41. The server of claim 39, wherein means for performing the one or more offline tool operations to generate the at least one pre-performed offline tool operation comprises means for generating a cascading style sheet.

42. The server of claim 39, wherein means for performing the one or more offline tool operations to generate the at least one pre-performed offline tool operation comprises means for performing a source to source transformation.

43. The server of claim 39, wherein means for performing the one or more offline tool operations to generate the at least one pre-performed offline tool operation comprises means for marking portions of a cascading style sheet that are not used.

44. The server of claim 39, wherein means for performing the one or more offline tool operations to generate the at least one pre-performed offline tool operation comprises means for performing the one or more offline tool operations on an executable script in the web page content to generate the at least one pre-performed offline tool operation.

45. The server of claim 39, wherein means for signing the generated at least one pre-performed offline tool operation comprises means for providing a signature that certifies that certain rules have been obeyed in the at least one pre-performed offline tool operation.

46. A computing device for processing content in a browser, comprising:
 a memory; and
 a processor coupled to the memory, wherein the processor is configured with processor-executable instructions to perform the steps comprising:
  receiving web page content associated with a web page, the web page content including a plurality of operations used to render the web page;
  separating the plurality of operations into offline tool operations and browser operations;
  receiving, in the browser, one or more pre-performed offline tool operations;
  using a signature verification process to verify a signature associated with at least one of the received pre-performed offline tool operations;
  rendering the web page, in response to the signature verification process confirming the signature associated with the at least one of the received pre-performed-offline tool operations, by performing the offline tool operations and the browser operations that do not correspond to the at least one of the received pre-performed offline tool operations and skipping the performance of the offline tool operations of the plurality of operations that correspond to the at least one of the received pre-performed offline tool operations; and
  rendering the web page, in response to the signature verification process not confirming the signature associated with the at least one of the received pre-performed-offline tool operations, by performing the separated offline tool operations and the browser operations of the plurality of operations.

47. The computing device of claim 46, wherein the processor is further configured with processor-executable instructions to perform the step comprising:
 rendering the web page, in response to the signature verification process not confirming the signature associated with the at least one of the received pre-performed-offline tool operations, by performing all of the offline tool operations and the browser operations of the plurality of operations and without using the at least one of the received pre-performed offline tool operations.

48. The computing device of claim 46, wherein the processor is configured with processor-executable instructions to perform steps further comprising incorporating the at least one of the received pre-performed offline tool operations while rendering the web page by performing the offline tool operations and the browser operations that do not correspond to the at least one of the received pre-performed offline tool operations.

49. The computing device of claim 46, wherein the processor is configured with processor-executable instructions to perform steps further comprising altering at least one browser operation of the plurality of operations based on the at least one of the received pre-performed offline tool operations.

50. The computing device of claim 46, wherein the processor is configured with processor-executable instructions to perform steps further comprising performing at least one browser operation of the plurality of operations corresponding to the at least one of the received pre-performed offline tool operations.

51. The computing device of claim 46, wherein the processor is configured with processor-executable instructions to perform steps such that using the signature verification process to verify the signature associated with the at least one of the received pre-performed offline tool operations comprises determining whether at least one operation of the plurality of operations corresponding to the at least one of the received pre-performed offline tool operations may be performed differently to achieve better results.

52. The computing device of claim 46, wherein the processor is configured with processor-executable instructions to perform steps further comprising:
 performing one or more of the offline tool operations to generate the one or more pre-performed offline tool operations received in the browser; and
 signing the one or more pre-performed offline tool operations.

53. The computing device of claim 52, wherein the processor is configured with processor-executable instructions to perform steps such that performing the one or more offline tool operations to generate the one or more pre-performed offline tool operations comprises generating JavaScript.

54. The computing device of claim 52, wherein the processor is configured with processor-executable instructions to perform steps such that performing the one or more offline tool operations to generate the one or more pre-performed offline tool operations comprises generating a cascading style sheet.

55. The computing device of claim 52, wherein the processor is configured with processor-executable instructions to perform steps such that performing the one or more offline tool operations to generate the one or more pre-performed offline tool operations comprises performing a source to source transformation.

56. The computing device of claim 52, wherein the processor is configured with processor-executable instructions to perform steps such that performing the one or more offline tool operations comprises marking portions of a cascading style sheet that are not used.

57. The computing device of claim 52, wherein the processor is configured with processor-executable instructions to perform steps such that signing the one or more of the received pre-performed offline tool operations comprises signing the one or more of the received pre-performed offline tool operations in a validator executing on the computing device.

58. The computing device of claim 52, wherein the processor is configured with processor-executable instructions to perform steps such that signing the one or more of the received pre-performed offline tool operations comprises providing a signature that certifies that certain rules have been obeyed in the one or more of the received pre-performed offline tool operations.

59. The computing device of claim 52, wherein the processor is configured with processor-executable instructions to perform steps such that performing the one or more offline tool operations to generate the one or more pre-performed offline tool operations comprises performing the one or more offline tool operations within the browser executing on the computing device.

60. The computing device of claim 59, wherein the processor is configured with processor-executable instructions to perform steps such that receiving the web page content associated with the web page further comprises retrieving signed pre-processed code from the memory.

61. The computing device of claim 60, wherein the processor is configured with processor-executable instructions to perform steps further comprising storing a result of the rendering of the web page.

62. The computing device of claim 52, wherein the processor is configured with processor-executable instructions to perform steps such that performing the one or more offline tool operations to generate the one or more pre-performed offline tool operations comprises performing the one or more offline tool operations on an executable script in the web page content to generate the one or more pre-performed offline tool operations.

63. The computing device of claim 62, wherein the processor is configured with processor-executable instructions to perform steps such that performing the one or more offline tool operations to generate the one or more pre-performed offline tool operations comprises pre-processing a portion of the web page content.

64. A server, comprising:
a memory; and
a processor coupled to the memory, wherein the processor is configured with processor-executable instructions to perform steps comprising:
performing one or more offline tool operations to generate at least one pre-performed offline tool operation, wherein the one or more offline tool operations are offline tool operations separated from browser operations and wherein the offline tool operations and the browser operations are a plurality of operations included in web page content associated with a web page;
signing the generated at least one pre-performed offline tool operation to enable a browser to perform a signature verification process to verify a signature associated with the at least one pre-performed offline tool operation;
including the signed at least one pre-performed offline tool operation within the web page content; and
sending the web page content to the browser, the browser being configured upon a computing device to render the web page by performing the offline tool operations and the browser operations of the plurality of operations that do not correspond to the at least one pre-performed offline tool operation generated by the server and skipping the performance of the offline tool operations of the plurality of operations that correspond to the at least one pre-performed offline tool operation generated by the server when the signature is verified, and to render the web page by performing the offline tool operations and the browser operations of the plurality of operations when the signature is not verified.

65. The server of claim 64, wherein the processor is configured with processor-executable instructions to perform steps such that performing the one or more offline tool operations to generate the at least one pre-performed offline tool operation comprises generating JavaScript.

66. The server of claim 64, wherein the processor is configured with processor-executable instructions to perform steps such that performing the one or more offline tool operations to generate the at least one pre-performed offline tool operation comprises generating a cascading style sheet.

67. The server of claim 64, wherein the processor is configured with processor-executable instructions to perform steps such that performing the one or more offline tool operations to generate the at least one pre-performed offline tool operation comprises performing a source to source transformation.

68. The server of claim 64, wherein the processor is configured with processor-executable instructions to perform steps such that performing the one or more offline tool operations to generate the at least one pre-performed offline tool operation comprises marking portions of a cascading style sheet that are not used.

69. The server of claim 64, wherein the processor is configured with processor-executable instructions to perform steps such that performing the one or more offline tool operations to generate the at least one pre-performed offline tool operation comprises performing the one or more offline tool operations on an executable script in the web page content to generate the at least one pre-performed offline tool operation.

70. The server of claim 64, wherein the processor is configured with processor-executable instructions to perform steps such that signing the at least one pre-performed offline tool operation comprises generating a signature that certifies that certain rules have been obeyed in the at least one pre-performed offline tool operation.

71. A non-transitory computer readable storage medium having stored thereon processor-executable software instructions configured to cause a processor to process content in a browser to perform steps comprising:
receiving web page content associated with a web page, the web page content including a plurality of operations used to render the web page;
separating the plurality of operations into offline tool operations and browser operations;
receiving, in the browser, one or more pre-performed offline tool operations;

using a signature verification process to verify a signature associated with at least one of the received pre-performed offline tool operations;

rendering the web page, in response to the signature verification process confirming the signature associated with the at least one of the received pre-performed offline tool operations, by performing the offline tool operations and the browser operations that do not correspond to the at least one of the received pre-performed offline tool operations and skipping the performance of the offline tool operations of the plurality of operations that correspond to the at least one of the received pre-performed offline tool operations; and rendering the web page, in response to the signature verification process not confirming the signature associated with the at least one of the received pre-performed offline tool operations, by performing the separated offline tool operations and the browser operations of the plurality of operations.

72. The non-transitory computer readable storage medium of claim 71, wherein the processor is further configured with processor-executable instructions to perform the step comprising:

rendering the web page, in response to the signature verification process not confirming the signature associated with the at least one of the received pre-performed offline tool operations, by performing all of the offline tool operations and the browser operations of the plurality of operations and without using the at least one of the received pre-performed offline tool operations.

73. The non-transitory computer readable storage medium of claim 71, wherein the stored processor-executable software instructions are configured to cause the processor to perform steps further comprising incorporating the at least one of the received pre-performed offline tool operations while rendering the web page by performing the offline tool operations and the browser operations that do not correspond to the at least one of the received pre-performed offline tool operations.

74. The non-transitory computer readable storage medium of claim 71, wherein the stored processor-executable software instructions are configured to cause a processor to perform steps further comprising altering at least one browser operation of the plurality of operations based on the at least one of the received pre-performed offline tool operations.

75. The non-transitory computer readable storage medium of claim 71, wherein the stored processor-executable software instructions are configured to cause the processor to perform steps further comprising performing at least one browser operation of the plurality of operations that corresponds to the at least one of the received pre-performed offline tool operations.

76. The non-transitory computer readable storage medium of claim 71, wherein the stored processor-executable software instructions are configured to cause the processor to perform steps such that using the signature verification process to verify the signature associated with the at least one of the received pre-performed offline tool operations comprises determining whether at least one browser operation of the plurality of operations corresponding to the at least one of the received pre-performed offline tool operations may be performed differently to achieve better results.

77. The non-transitory computer readable storage medium of claim 71, wherein the stored processor-executable software instructions are configured to cause the processor to perform steps further comprising:

performing one or more of the offline tool operations to generate the one or more pre-performed offline tool operations received in the browser; and signing the one or more pre-performed offline tool operations.

78. The non-transitory computer readable storage medium of claim 77, wherein the stored processor-executable software instructions are configured to cause the processor to perform steps such that performing the one or more offline tool operations to generate the one or more pre-performed offline tool operations comprises generating JavaScript.

79. The non-transitory computer readable storage medium of claim 77, wherein the stored processor-executable software instructions are configured to cause the processor to perform steps such that performing the one or more offline tool operations to generate the one or more pre-performed offline tool operations comprises generating a cascading style sheet.

80. The non-transitory computer readable storage medium of claim 77, wherein the stored processor-executable software instructions are configured to cause the processor to perform steps such that performing the one or more offline tool operations to generate the one or more pre-performed offline tool operations comprises performing a source to source transformation.

81. The non-transitory computer readable storage medium of claim 77, wherein the stored processor-executable software instructions are configured to cause the processor to perform steps such that performing the one or more offline tool operations to generate the one or more pre-performed offline tool operations comprises marking portions of a cascading style sheet that are not used.

82. The non-transitory computer readable storage medium of claim 77, wherein the stored processor-executable software instructions are configured to cause the processor to perform steps such that signing the one or more of the received pre-performed offline tool operations comprises signing the one or more of the received pre-performed offline tool operations in a computing device on which a validator is executing.

83. The non-transitory computer readable storage medium of claim 77, wherein the stored processor-executable software instructions are configured to cause the processor to perform steps such that signing the one or more of the received pre-performed offline tool operations comprises providing a signature that certifies that certain rules have been obeyed in the one or more of the received pre-performed offline tool operations.

84. The non-transitory computer readable storage medium of claim 77, wherein the stored processor-executable software instructions are configured to cause the processor to perform steps such that performing the one or more offline tool operations to generate the one or more pre-performed offline tool operations comprises performing the one or more offline tool operations within the browser.

85. The non-transitory computer readable storage medium of claim 84, wherein the stored processor-executable software instructions are configured to cause the processor to perform steps such that receiving the web page content associated with the web page further comprises retrieving signed pre-processed code from a memory of a computing device on which the browser is executing.

86. The non-transitory computer readable storage medium of claim 85, wherein the stored processor-executable software instructions are configured to cause the processor to perform steps further comprising:

storing a result of the rendering of the web page in the memory of the computing device.

87. The non-transitory computer readable storage medium of claim 77, wherein the stored processor-executable software instructions are configured to cause the processor to perform steps such that performing the one or more offline tool operations to generate the one or more pre-performed offline tool operations comprises performing the one or more offline tool operations on an executable script in the web page content to generate the one or more pre-performed offline tool operations.

88. The non-transitory computer readable storage medium of claim 87, wherein the stored processor-executable software instructions are configured to cause the processor to perform steps such that performing the one or more offline tool operations on the executable script in the web page content to generate the one or more pre-performed offline tool operations comprises pre-processing a portion of the web page content.

89. A non-transitory computer readable storage medium having stored thereon server-executable software instructions configured to cause a server to perform steps comprising:

performing one or more offline tool operations to generate at least one pre-performed offline tool operation, wherein the one or more offline tool operations are offline tool operations separated from browser operations and wherein the offline tool operations and the browser operations are a plurality of operations included in web page content associated with a web page;

signing the generated at least one pre-performed offline tool operation to enable a browser to perform a signature verification process to verify a signature associated with the at least one pre-performed offline tool operation;

including the signed at least one pre-processed offline tool operation within the web page content; and sending the web page content to the browser, the browser being configured upon a computing device to render the web page by performing the offline tool operations and the browser operations of the plurality of operations that do not correspond to the at least one pre-performed offline tool operation generated by the server and skipping the performance of the offline tool operations of the plurality of operations that correspond to the at least one pre-performed offline tool operation generated by the server when the signature is verified, and to render the web page by performing the offline tool operations and the browser operations of the plurality of operations when the signature is not verified.

90. The non-transitory computer readable storage medium of claim 89, wherein the stored server-executable software instructions are configured to cause the server to perform steps such that performing the one or more offline tool operations to generate the at least one pre-performed offline tool operation comprises generating JavaScript.

91. The non-transitory computer readable storage medium of claim 89, wherein the stored server-executable software instructions are configured to cause the server to perform steps such that performing the one or more offline tool operations to generate the at least one pre-performed offline tool operation comprises generating a cascading style sheet.

92. The non-transitory computer readable storage medium of claim 89, wherein the stored server-executable software instructions are configured to cause the server to perform steps such that performing the one or more offline tool operations to generate the at least one pre-performed offline tool operation comprises performing a source to source transformation.

93. The non-transitory computer readable storage medium of claim 89, wherein the stored server-executable software instructions are configured to cause the server to perform steps such that performing the one or more offline tool operations to generate the at least one pre-performed offline tool operation comprises marking portions of a cascading style sheet that are not used.

94. The non-transitory computer readable storage medium of claim 89, wherein the stored server-executable software instructions are configured to cause the server to perform steps such that performing the one or more offline tool operations to generate the at least one pre-performed offline tool operation comprises performing the one or more offline tool operations on an executable script in the web page content to generate the at least one pre-performed offline tool operation.

95. The non-transitory computer readable storage medium of claim 89, wherein the stored server-executable software instructions are configured to cause the server to perform steps such that signing the at least one pre-performed offline tool operation comprises providing a signature that certifies that certain rules have been obeyed in the at least one pre-performed offline tool operation.

96. A system, comprising:
a client device for processing content in a browser, the client device comprising a client memory and a client processor coupled to the client memory; and a server comprising a server memory and a server processor coupled to the server memory, wherein the client processor is configured with processor-executable instructions to perform steps comprising:
receiving web page content associated with a web page, the web page content including a plurality of operations used to render the web page;

separating the plurality of operations into offline tool operations and browser operations;

receiving, in the browser, one or more pre-performed offline tool operations;

using a signature verification process to verify a signature associated with at least one of the received pre-performed offline tool operations;

rendering the web page, in response to the signature verification process confirming the signature associated with the at least one of the received pre-performed-offline tool operations, by performing the offline tool operations and the browser operations that do not correspond to the at least one of the received pre-performed offline tool operations and skipping the performance of the offline tool operations of the plurality of operations that correspond to the at least one of the received pre-performed offline tool operations; and rendering the web page, in response to the signature verification process not confirming the signature associated with the at least one of the received pre-performed-offline tool operations, by performing the separated offline tool operations and the browser operations of the plurality of operations, and wherein the server processor is configured with server-executable instructions to perform steps comprising:

performing one or more offline tool operations to generate the one or more pre-performed offline tool operations received in the browser;

signing the one or more of the pre-performed offline tool operations received in the browser to enable the browser to perform the signature verification process; and sending the web page content and the signed one or more of the pre-performed offline tool operations to the browser.

97. The system of claim 96, wherein the client processor is further configured with processor-executable instructions to perform the step comprising:

rendering the web page, in response to the signature verification process not confirming the signature associated with the at least one of the received pre-performed-offline tool operations, by performing all of the offline tool operations and the browser operations of the plurality of operations and without using the at least one of the received pre-performed offline tool operations.

98. The system of claim 97, wherein the client processor is configured with processor-executable instructions to perform steps such that receiving the web page content comprises receiving the web page content from the server.

99. The system of claim 97, wherein the client processor is configured with processor-executable instructions to perform steps further comprising incorporating the at least one of the received pre-offline tool operations while rendering the web page by performing the offline tool operations and the browser operations that do not correspond to the at least one of the received pre-performed offline tool operations.

100. The system of claim 96, wherein the client processor is configured with processor-executable instructions to perform steps further comprising altering a browser operation of the plurality of operations based on at least one of the pre-performed offline tool operations received in the browser.

101. The system of claim 96, wherein the client processor is configured with processor-executable instructions to perform steps further comprising performing a browser operation of the plurality of operations corresponding to the at least one of the pre-performed offline tool operations received in the browser.

102. The system of claim 96, wherein the client processor is configured with processor-executable instructions to perform steps such that using the signature verification process to verify the signature associated with the at least one of the received pre-performed offline tool operations comprises determining whether at least one browser operation of the plurality of operations corresponding to the at least one of the received pre-performed offline tool operations may be performed differently to achieve better results.

103. The system of claim 96, wherein the server processor is configured with server-executable instructions such that performing the one or more offline tool operations to generate the at least one pre-performed offline tool operation comprises generating JavaScript.

104. The system of claim 96, wherein the server processor is configured with server-executable instructions such that performing the one or more offline tool operations to generate the at least one pre-performed offline tool operation comprises generating a cascading style sheet.

105. The system of claim 96, wherein the server processor is configured with server-executable instructions such that performing the one or more offline tool operations to generate the at least one pre-performed offline tool operation comprises performing a source to source transformation.

106. The system of claim 96, wherein the server processor is configured with server-executable instructions such that performing the one or more offline tool operations to generate the at least one pre-performed offline tool operation comprises marking portions of a cascading style sheet that are not used.

107. The system of claim 96, wherein the server processor is configured with server-executable instructions such that performing the one or more offline tool operations to generate the at least one pre-performed offline tool operation comprises performing the one or more tool operations on an executable script in the web page content to generate the at least one pre-performed offline tool operation.

108. The system of claim 96, wherein the server processor is configured with server-executable instructions such that signing the one or more pre-performed offline tool operation comprises generating a signature that certifies that certain rules have been obeyed in the one or more pre-performed offline tool operation.

* * * * *